United States Patent [19]

Grzybowski

[11] Patent Number: 5,236,497
[45] Date of Patent: Aug. 17, 1993

[54] COLD PATCH USING RECYCLED ROOFING WASTE

[75] Inventor: Ken F. Grzybowski, Temple Terrace, Fla.

[73] Assignee: ReClaim, Inc., Tampa, Fla.

[21] Appl. No.: 917,910

[22] Filed: Jul. 21, 1992

Related U.S. Application Data

[63] Continuation of Ser. No. 664,104, Mar. 4, 1991, abandoned.

[51] Int. Cl.$^5$ ............................................. C08L 95/00
[52] U.S. Cl. .................................... 106/282; 106/271
[58] Field of Search ............................... 106/278, 282

[56] References Cited

U.S. PATENT DOCUMENTS

| | | | |
|---|---|---|---|
| 4,706,893 | 11/1987 | Brock | 241/101 B |
| 4,726,846 | 2/1988 | Jackson et al. | 106/284.01 |
| 4,908,064 | 3/1990 | Plummer | 106/281.1 |

*Primary Examiner*—David Brunsman
*Attorney, Agent, or Firm*—Jansson & Shupe, Ltd.

[57] ABSTRACT

An improved cold patch composition for pavement repair and method of preparation therefore, including recycled asphalt roofing waste, aggregate, and solvent. Recycled asphalt roofing waste provides an excellent, although unexpected, source of asphalt, filler, and fiber, which when used in conjunction with the method of this invention provides compositions having remarkable engineering performance properties quickly upon application, with little cure time. Use of asphalt roofing wastes represents a means of recycling a non-renewable resource and providing an environmentally-safe alternative to landfill disposal of such materials.

17 Claims, No Drawings

COLD PATCH USING RECYCLED ROOFING WASTE

This is a continuation of Ser. No. 07/644,104, filed 4 Mar. 1991, now abandoned.

FIELD OF THE INVENTION

This invention is related generally to asphalt pavements and, more particularly, to asphalt cold patch compositions for pavement repair.

BACKGROUND OF THE INVENTION

Regardless of the pavement composition, repairs are inevitable, especially in wet climate areas and those susceptible to repeated freeze-thaw cycles. For many years cold patch compositions have been an integral part of a short-term solution to the problem of distressed roadway pavement. Such materials have been used by various municipal, state, federal, and independent highway agencies to temporarily repair potholes, cracks, ruts, etc. (For the purpose of this discussion, the term "cold patch" will be used to refer to asphaltic repair material of this sort, made without heating, otherwise known by a variety of terms, including pot- or chuckhole patch mix, bituminous concrete winter mix, stockpile patching material, and cold mix.)

Typically, cold patches comprise graded aggregates uniformly-coated with a pre-formulated asphaltic bitumen solution or emulsion, prepared by dissolving an asphalt in an appropriate solvent, usually a petroleum distillate such as mineral spirits, naphtha, kerosene, fuel oil, flux oil or the like. (Asphalt-water emulsions tend to be used less-frequently than their solvent counterparts.) Surfactants are often added to promote a variety of desirable properties such as internal cohesion and asphalt adhesion to the aggregate surface.

After loose dirt or debris is removed from the distressed area, cold patch is applied liberally such that it is level with the roadway surface after compaction. In many instances "throw and go" application techniques are utilized, whereby the cold patch is simply shoveled from the back of a truck onto the distressed area, leaving it to subsequent motor vehicle traffic to provide the necessary compaction. As imagined, it is desireable that a cold patch remain "workable" in any weather condition, regardless of the length or type of outdoor storage. ("Workable" is defined as being easily applied via shovel.)

Casual observation shows pavement repair to be an on-going exercise in most communities. Because complete pavement restoration is extremely-costly, it is advantageous to utilize cold patch repair whenever possible. As a result, a tremendous amount of cold patch material is consumed each year by various independent and government highway agencies. While cold patch compositions are relatively inexpensive, cost is still an overriding concern given the volumes used.

A concurrent problem relates to the accumulation of asphalt roofing wastes. Each year, according to a recent estimate, approximately 70 million squares of roofing shingles are produced in the United States. A square, by definition, is material sufficient to cover 100 square feet of surface area without overlap, typically contains 80 shingles, and depending on the particular shingle composition, weighs between 210-225 pounds. Shingles produced after 1980 are 20-30% asphalt by weight, with the remainder fiberglass mat, roofing granules, filler, and back-surfacing materials. Those produced prior to 1980 contain roughly 1.5 times the amount of asphalt.

Significant waste accompanies the manufacture of asphalt shingles. Broken and defective shingles are discarded. Production of a standard three-tab shingle produces cut-outs and trimmings which total nearly 1% of its total weight. Based on annual shingle production figures (and using post-1980 composition data), approximately 77,000 tons of shingle cut-outs/trimmings and 20,000 tons of asphalt are generated each year. The total amount of broken and defective shingles discarded annually is of a comparable magnitude.

An additional facet of the situation is that a significant amount of previously-applied shingles are recovered each year. The typical residential roof may be re-shingled up to three times before all old shingles are removed. On an annual basis approximately 4.2 billion pounds of asphalt are generated each year in this manner—in addition to the manufacturing wastes mentioned above.

The annual amount of annual waste attributable to shingles provides only a glimpse as to the real scope of the problem. Other types of asphalt roofing materials include asphalt-saturated organic felts, asphalt-impregnated glass and polyester mats, rolled roofing products such as ply sheets, modified bitumen membranes and the like, as well as commercial build-up roofs (alternating layers of asphalt and prepared rolled roofing products on commercial buildings). Each has associated with it a significant amount of waste. (For the purpose of this discussion, the term "asphalt roofing wastes" will be used to refer to wastes generated through the manufacture and/or disposal of these and other like materials.)

For many years, asphalt roofing wastes have been land-filled. What once seemed to be a safe and sound "solution" spawned a variety of more worrisome concerns, foremost among which is the creation of permanent landfills—land which over time becomes non-reclaimable. Furthermore, with an increasingly-larger population and ever-growing volume of solid waste, the number of available landfills has dwindled to the point where most states now ban certain types of refuse. It is no longer environmentally-wise or economically-feasible to continue landfill disposal of asphalt roofing wastes.

The search for an efficient and high-volume use for asphalt roofing wastes meeting the requirements stated above has been an ongoing concern in the art. One approach, with application to roadway surfaces and described in U.S. Pat. No. 4,325,641, relates to a method of recycling asphalt shingles whereby a hot mix pavement end product is derived which comprises about 0% by weight recycled asphalt shingle waste and about 0% by weight asphaltic oil. A similar approach, discussed in U.S. Pat. No. 4,706,893, also relates to a method of recycling asphalt waste such that a hot mix pavement end product comprises about 5-6% asphalt, of which only about 40% of the asphalt component —or 2% of the total weight of the composition—is derived from recycled shingles; the remainder made of a paving grade liquid asphalt.

Both patents mentioned above provide a method and apparatus whereby asphalt roofing waste may be used as a minor additive in an asphalt paving composition. The amount of asphalt roofing wastes also used and recycled in this manner is a very small percentage of that available. The reuse limitation is inherent to the nature of asphalt pavement materials.

As mentioned above, pavement comprises no more than 6% by weight asphalt. If more is used, the pavement surface becomes oily and slick at normal summer temperatures, due to excess asphalt actually oozing or "flushing" out of the composition. An asphalt pavement is defined largely by its aggregate component. The aggregate is of a size, cut, and porosity which imparts to it a relatively large surface area per unit volume. In order to ensure 100% coating, a high-penetrating asphalt is needed, one which is readily fluid at process temperatures of 300°–400° F. Oxidized asphalts, found in roofing products, are not of this type and present process problems and subsequent mix design difficulties if substituted for conventional paving grade asphalt. As a result, no more than 40% of the asphalt component—or 2% of the total weight of the pavement composition—may be derived from recycled asphalt roofing wastes.

Even if the use of more recycled asphalt roofing waste was found to provide a suitable hot mix pavement composition extension of the technique to a pavement repair compostion would be no more feasible than it is now. While a "hot patch" would be the material of choice, it is not practical in cold temperatures or rain conditions. Constant heating and related process requirements are too costly for minor repair work. Substituting use of a solvent for heat, cold patch compostions are economically-feasible and workable in a variety of weather conditions.

The search for a cost-efficient and effective cold patch composition, along with a beneficial use of recycled roofing waste, has been an on-going concern in the art. One attempt has been to blend a very small amount of asphaltic waste, including asphalt roofing wastes, with a pre-made commercial cold patch material, as an economizing measure. A heat source melts the asphalt waste into the pre-made cold patch. While this approach represents a use, albeit limited, for recycled asphalt roofing wastes, it does not provide, by any definition, a cold patch material. A cost-prohibitive heat source is required through application, irrespective of weather conditions, and the material obtained is completely unsatisfactory in terms of workability and performance.

The prior art has associated with it a number of obvious and significant problems and deficiencies, regardless of whether a minor portion of the bitumen component is derived from recycled asphalt roofing wastes. Most cold patch problems are related to poor performance and result from the type of asphalt and methods of preparation currently employed.

A major problem of the prior art stems from the fact that a cold patch composition must be designed in such a manner that pertinent physical properties can be measured with some degree of precision and correlated to actual roadway performance. Many governmental units concerned with this situation, including state highway agencies, have adopted such an engineering-based approach. Several are used, but the most widely-accepted approach is known as the "Marshall Method".

The recent trend is to transfer responsibility for cold patch design from specifying agencies to the independent contracting industry. Because of the current emphasis on engineering performance properties, a cold patch can no longer be sold merely on the basis of a "recipe" formulation which does not correlate well to quality and performance. The contractor engaged in competitive bidding must, therefore, be able to provide performance properties when samples are submitted.

The problem arises in that no conventional cold patch composition has engineering performance properties in the "green state"—prior to solvent evaporation, as would exist at the time of pothole application. As such, most cold patches of the prior art do not physically withstand the test procedures employed such that measurements can be made. Those which do provide measurements give results which correlate directly to the poor roadway performance eventually observed.

Another related problem is that cold patches of the prior art perform poorly in terms of cohesion and adhesion. Cohesion refers to the internal integrity of the cold patch. Inadequate cohesion is typically evidenced by the scattering of cold patch as one drives over a newly-patched pothole. Over time, the cold patch becomes strewn in all directions instead of remaining in the pothole. Adhesion is the bonding interaction between the cold patch and the pavement structure. Inadequate adhesion causes the cold patch to eventually work away from the pavement and recreate the pothole.

A related concern is the prolonged curing time required by conventional cold patches. Cohesive integrity is achieved only upon evaporation of the solvent used in the cold patch preparation. Evaporation time is often extended, often up to days, by geographic and climatic factors. Because it is extremely undesireable to re-route or stop traffic for every minor repair, much of the cold patch applied is often scattered by vehicle traffic before it is sufficiently cured.

The result of long curing times and inadequate cohesion or adhesion, is the likelihood of multiple repair of the same distress areas over the course of a typical repair season. Inasmuch as cost is a tremendous concern to any governmental body or department working against budgetary constraints, multiple repairs represent an unneeded expense.

Another significant drawback to cold patches of the prior art relates to the asphalt used therein. Soft asphalts, which are very temperature-susceptible, are typically used. As thermoplastic materials, they become hard and cement-like upon a drop in ambient air temperature, but excessively-fluid upon a temperature rise. Inability to remain stable over a range of temperatures adversely effects workability, especially at colder temperatures. Application becomes time-consuming if the cold patch is hard and difficult to shovel.

Performance is also effected adversely by temperature-susceptibility. As with pavement materials, a common problem of conventional cold patches, one readily-observed on a hot summer day, is flushing. Repeated traffic also "ruts" or otherwise deforms softened cold patch. Ruts intensify with repeated traffic and each subsequent temperature rise, invariably necessitating further repair.

Various filler and fiber materials may be included to enhance performance by stabilizing and strengthening the cold patch. However, addition of such materials is costly. Because of the large volume of cold patch used, any increase in cost is prohibitive. Unfortunately, many agencies opt for a cheaper, though less-capable, cold patch composition.

If filler and fiber materials are added, inefficiencies abound. Because they tend to have a dust-like consistency, a significant amount is often lost under the negative air pressure conditions typically employed during mixing, further raising the effective cost. Dispersal of the filler and fiber throughout the cold patch is problematical and achieved only after much effort. Non-uniform dispersal provides a non-homogeneous cold patch with inconsistent performance, which raises the effective cost even more by necessitating multiple repairs.

In summary, there are a considerable number of drawbacks and problems relating to cold patch materials for roadway repair. There is a need for a improved cold patch, especially one which takes advantage of the environmental and commercial benefits associated with recycled asphalt roofing wastes.

OBJECTS OF THE INVENTION

It is an object of this invention to overcome some of the problems and shortcomings of the prior art.

Another object is to provide an improved cold patch for roadway repair such that the dominant, if not only, source of its asphalt, filler and fiber content is recycled asphalt roofing waste.

Another object of this invention is to provide an improved cold patch for roadway repair and method of production overcoming the problems of the prior art, including those mentioned above.

Another object of this invention is to provide an improved cold patch for roadway repair which has measureable engineering performance properties in the green state, as determined by the Marshall and other such methods.

Another object of this invention is to provide an improved cold patch for roadway repair available to local, state, federal, and independent highway agencies on the basis of measureable engineering performance properties.

Another object of this invention is to provide an improved cold patch for roadway repair such that cohesive and adhesive integrity, as well as overall strength and stability, are achieved quickly upon application, without prolonged cure times.

Another object of this invention is to provide an improved cold patch for roadway repair which is efficient and economical such that the same pothole does not have to be filled more than once over the course of a single repair season.

Another object of this invention is to provide an improved cold patch for roadway repair which utilizes a less temperature-susceptible asphalt such that workability and other desirable characteristics are maintained over a variety of temperatures.

Another object of this invention is to provide an improved cold patch for roadway repair such that flushing and rutting are avoided, even at high traffic and temperature conditions.

Another object of this invention it to provide an improved method of cold patch preparation such that performance-enhancing filler and fiber materials are introduced at low cost.

Another object of this invention is provide an improved method of cold patch preparation such that excellent mix dispersion and homogeneity of asphalt, filler, and fiber are obtained efficiently and economically.

These and other important objects will be apparent from the descriptions of this invention which follow.

SUMMARY OF THE INVENTION

This invention is an improved cold patch composition, and method of preparing such a composition, for use in roadway repair. It overcomes certain wellknown problems and deficiencies, including those outlined above, while providing a solution to a long-standing environmental concern and decreasing this country's consumption of oil and energy.

An important aspect of this invention is recycled asphalt roofing waste as the dominant, if not sole, source of bitumen and performance-enhancing filler and fiber in the cold patch. The inventive composition and method involves in situ formation of an asphalt cutback, thereby providing better asphalt, filler, and fiber dispersion and composition homogeneity in a shorter amount of time. "In situ" is defined generally as meaning "in location" or "in place". In the chemical context and that used herein, the term describes formation of an intermediate which is not isolated or transferred prior to further use, but consumed immediately to yield an end product. In the method of this invention, asphalt and lubricating and wet surface adhesion-enhancing solutions are coated on the aggregate with minimal mixing to provide the cold patch composition of this invention.

In part, this invention is an asphaltic bitumen pavement repair composition, including (1) about 10-95 parts by weight recycled asphalt roofing waste as source of asphalt, filler, and fiber, (2) about 19-70 parts by weight aggregate, and (3) about 1-20 parts by weight solvent. In preferred embodiments, the asphalt roofing waste is the dominant source of asphalt, filler, and fiber. In highly preferred embodiments, the asphalt roofing waste is substantially the only source of these components. It may be obtained from manufacturing excess, recovered asphalt roofing products, products removed from a landfill, and mixtures thereof.

In preferred embodiments, the roofing waste is about 40-60 parts by weight of the composition and sizegraded to a dimension less then about 9.5 mm. In highly preferred embodiments, the roofing waste is size-graded to a range of about 0.85-4.75 mm.

The solvent component of the pavement repair composition is preferably about 2-10 parts by weight and is selected from the group consisting of petroleum distillates and mixtures thereof. In preferred embodiments of this invention the distillate includes a surfactant dissolved therein. In highly-preferred embodiments, the surfactant is an amine anti-strip agent, wherein the ratio of distillate to anti-strip agent is at least about 4:1.

Completing the composition of this invention, preferred embodiments include 40-60 parts by weight aggregate, wherein the aggregate is crushed stone, sizegraded to a dimension less than about 19.0 mm. In highly-preferred embodiments, about one-half of the crushed stone is size-graded to about 0.85 mm and about one-half thereof is size-graded to about 4.75 mm.

The method of this invention begins with a mixture of 19-70 parts by weight aggregate with about 1-20 parts by weight solvent. Subsequently, about 10-95 parts by weight recycled asphalt roofing wastes is added thereto whereby an asphaltic bitumen solution having a homogeneous dispersion of filler and fiber is readily formed in situ.

As with the composition, the method of this invention utilizes roofing wastes selected from the group consisting of manufacturing excess, recovered asphalt roofing products, products recovered from a landfill, and mixtures thereof. In preferred embodiments of this method, recycled asphalt roofing waste is the dominant source of asphalt, filler, and fiber. In highly preferred embodiments, the roofing waste is substantially the only source of asphalt, filler, and fiber.

Preferred embodiments of this method include adding about 40-60 parts by weight roofing wastes, size-graded to a dimension less than about 9.5 mm. In highly preferred embodiments of this method, the roofing waste is size-graded to a range of about 0.85-4.75 mm. The smallest grade roofing waste is added first. Thorough mixing is accomplished before any of a larger grade is added.

As previously noted, the composition and method of this invention are primarily distinguishable from the prior art in that the bitumen, filler, and fiber components utilized may be derived entirely from recycled asphalt roofing wastes. Such wastes are generated through the manufacturing processes for the various asphalt roofing products and through replacement and repair of existing roofing applications. To the extent such wastes are recovered from landfill facilities, this invention also represents a means toward land reclaimation.

Production of asphalt roofing materials represents a significant component of petroleum consumption. Recycling what would otherwise be considered garbage helps cut use of a non-renewable resource. Moreover, the energy and cost required to produce asphalt for cold patch materials is saved, having already once been expended, further lowering energy consumption and government spending. Repeated conflicts with major oil-producing countries and record budget deficits here at home underscore the potential impact of this invention.

Cold patch compositions of the present invention, unlike those of the prior art, have measureable engineering performance properties. For example, flow and stability measurements, as well as tensile strength ratios and water susceptibilities, may be readily-obtained and correlated to eventual field performance. Availability of meaningful data of this sort at the time of sample evaluation is a considerable improvement over the prior art and provides a tremendous marketing and sales advantage.

The procedures for determining the various performance properties will not be discussed at length, but are well-known to those skilled in the art. Many state agencies publish their own test methods and criteria on which to evaluate eventual field performance. Reference is made to American Association of State Highway and Transportation Officials (AASHTO) and American Society for Testing and Materials (ASTM) standard test procedures, as well as other authorities on composition design methods.

Suffice it to say, for the purpose of this discussion, most methods to determine engineering performance properties begin with sample preparation. A core of cold patch material, is made according to specifications on a compactor such that its density is comparable to the ultimate, anticipated compaction density achieved under traffic conditions. The core specimen is evaluated "as is", then re-evaluated after some prescribed conditioning (heating, to evaporate solvent and cure the composition). For both Marshall stability and flow measurements, two properties determined by the widely-accepted Marshall method, the specimen is place in hot water long enough to bring it to a temperature of 140° F. within a specified time period.

After drying, force is applied to the specimen to determine either Marshall flow or Marshall stability values. If multiple samples of varying mix designs are tested, the results may be charted graphically. For Marshall stability values, pounds-force needed to shatter the specimen is plotted versus percent asphalt content. For Marshall flow values, flow measurements in terms of 1/100 inch upon application of a constant force may be plotted against percent asphalt content.

Generally, with regard to stability, high Marshall values are desirable at low asphalt contents. With regard to Marshall flow, values indicating low deformation upon compression, at any asphalt content, are desirable. Compositions of this invention are routinely tested against cold patches of the prior art. As shown in Example 11 below, with regard to Marshall stability, one conventional cold patch material was non-compactable under test conditions and fell apart during sample formation. Compared to another currently-available material, a cold patch of this invention provided more than a 180% increase in Marshall stability, when both were tested with no pre-conditioning (curing).

The inventive composition and method allow introduction of a temperature-stable asphalt, as well as performance-enhancing and mix-stabilizing filler and fiber in one step. Recycled asphalt roofing waste contains both of these ingredients, in addition to aggregate. Because all are components of a useful cold patch composition economy and efficiency are realized.

The asphalt of such roofing waste is distinct from conventional paving asphalts. The unique property is acquired during the roofing manufacturing process, wherein the asphalt is typically heated to temperatures near 500° F. and treated with dried air. Various polymerization and condensation reactions initiated in this manner compositionally alter the asphalt, presenting a unique binder under roadway conditions.

Conventional cold patch materials are very temperature-susceptible and characterized by low softening-points, high penetrations, ductibility, and low viscosities, as determined by accepted standardized AASHTO and ASTM procedures. The average cold patch of the prior art has a softening point in the range of 95°-120° F., with a corresponding penetration (weighted needle procedure) of >15 mm at 77° F. Compare the physical properties of the average cold patch of this invention: a softening point in the range of 150°-180° F., and a penetration 4-10 mm at 77° F., as determined by the same accepted standard procedures. Clearly, the latter cold patch composition is more temperature-stable. From a practical standpoint, asphalt derived from recycled roofing wastes provides a binder with greater cohesive strength and less tendency to flush and/or rut at typical roadway temperatures.

Preferred embodiments of the composition of this invention comprise about 40-60 parts by weight recycled asphalt roofing waste. Excellent engineering performance properties, as determined by the Marshall and similar method, are obtained. Compositions with a recycled asphalt component beyond the preferred range tend to be less satisfactory with regard to lower stability and higher flows at all temperatures. Conversely, if the recycled asphalt content falls below the lower end of the preferred range cohesion and adhesion become a concern.

The recycled asphalt roofing wastes used in this invention would not seem appropriate for cold patch compositions. It is conventional wisdom that asphalt comprises no more than 6% of an asphalt pavement composition, of which only 40% of the asphalt component may derive from recycled roofing wastes. Furthermore, cold patches of the prior art are only about 3% asphalt by weight. It would seem improbable that the quantities of asphalt roofing wastes considered herein could be used effectively in a cold patch compostion. It would also seem improbable for reasons explained above that such wastes provide the coating, cohesion, and adhesion properties desired.

The use of recycled asphalt roofing wastes in the manner and to the extent disclosed herein is contrary to the state of the art. The results obtained were quite unexpected. Without advancing any one explanation it appears the asphalt derived from such wastes is sufficiently different to permit a composition design to accomodate a larger asphalt component than otherwise thought possible. More asphalt, in turn, provides better cohesive and adhesive properties, especially so when the asphalt contains performance-enhancing filler and fiber.

The roofing wastes discussed herein contain asphalt-coated inorganic filler and reinforcing fiber which enhance cold patch performance over a wide range of temperatures. The exact nature of each depends on the source of the roofing waste. Generally, fibers include cellulose, fiberglass, and various synthetic fibers such as polyester. Filler may include the form of limestone, sand, and other such materials.

In cold temperatures and through freeze-thaw cycles filler and fiber prevent thermal-cracking. In warm temperatures, the same materials coupled with a less temperature-susceptible asphalt minimize rutting, surface failures associated with fatigue stresses and strains, and load-induced deformations caused by high vehicular traffic.

Conventional cold patches may incorporate fiber, although several current market leaders do not due to cost considerations. An increase in cost translates into decreased sales no matter how much performance is improved. The composition of this invention utilizes a source of filler and fiber, already present in the recycled asphalt roofing waste. Performance is enhanced without increased cost.

Because of the unique synergy between filler, fiber, and the less temperature-susceptible asphalt, the cold patch composition of this invention exhibits what is commonly-known as "green strength". Unlike conventional materials, little curing is needed to achieve optimal stability. The cold patch composition of this invention exhibits excellent cohesion and adhesion properties shortly after application, both of which improve even more over time.

As a result, pothole repair is achieved effectively, even with "throw and go" application techniques. Efficiency is also maximized in that there is no need for multiple application to the same pothole over the course of a single repair season. In addition to cost saved through the use of recycled waste materials, this efficiency represents an additional economic incentive.

Successful cold patch compositions may be formulated with a variety of petroleum distillate solvents, including fuel oil, kerosene, mineral spirits, flux oils and the like. Other solvents found useful include gas and mist oils. The amount of solvent used affects the workability of the composition and eventual field performance. In preferred embodiments, solvent comprises 2-10 parts by total weight of the composition. Less solvent tends to result in compositions which are hard to compact and have inadequate cohesive and adhesive strengths. Solvent beyond the high end of this range, promotes cohesive and adhesive strength, but causes the composition to remain soft for prolonged periods of time after application, during which rutting and other deformations may occur.

The amount of solvent employed is, to some degree, a function of the petroleum distillate fraction chosen. Less is required if a lighter, lower boiling fraction is used, whereas higher boiling fractions require a greater volume to achieve the desired compositional characteristics. For instance, workability is not only affected by the amount but also the type of solvent chosen. A petroleum distillate having a relatively high viscosity will result in a cold patch composition with poor workability in colder temperatures.

Depending upon the composition and application required, workability problems can be mitigated through the use of an anti-strip agent. Anti-strip agents are typically thought to enhance the water/moisture stabilities of aggregate-asphalt bonding interactions. As a result, the positive effect on workability observed is unanticipated. The exact mechanism by which anti-strip agents function in this capacity is not fully understood. Likewise, no one rationale is offered to explain the observation that amine anti-strip agents perform especially well in preferred embodiments of this invention. However, any conventional and/or proprietary liquid anti-strip agent may be used with satisfactory results and are available from various concerns including Exxon Chemical Americas of Milton, Wisconsin, Scan-Road of Waco, Tex., Akzo-Chemi of Chicago, Ill., ARR-MAZ of Lakeland, Fla., and SHEREX Chemical Company of Dublin, Ohio, among others.

Anti-strip agents are only one of many ingredients which may be dissolved in a solvent of this composition. Others include adhesion-enhancing polymers, tactifying resins, and lubricating oils. As with anti-strip agents, all act as surfactants to modify the physical properties of the cold patch composition.

In preferred compositions of this invention the ratio of solvent to anti-strip agent is at least about 4:1. Lower solvent levels adversely affect cohesive and adhesive stengths. Lower portions of anti-strip agent impairs workability and wet-surface adhesion. Certain commercially-available anti-strip agents are available as solutions of varying concentrations. It is within the scope of this invention that such anti-strip agents may be used to satisfy the solvent requirements of this composition.

Aggregate performs a dual function within the context of a cold patch composition. It has a performance function, in that it stabilizes the composition by absorbing stress and strain. From a purely aesthetic perspective, aggregate also provides a cold patch with a pleasing uniform appearance.

The choice of aggregate type and gradation significantly effects workability and performance. A uniform gradation, such as that achieved with washed, rounded river gravels, promotes workability, but tends to provide less than the optimal stability and strength desired. On the other hand, aggregate sized to optimize strength and stability tends to become compact and less workable over time.

In preferred embodiments of this invention, crushed stone aggregates, having multiple-fractured surfaces, provide the best of two, otherwise competing qualities. Optimal stabilities and strengths are achieved with selected gradations, without a sacrifice in workability. Cold patch compositions of this invention utilizing crushed stone aggregates will remain workable even if stored outside with little or no protection for prolonged periods of time.

It is not intended that the aggregate of the composition of this invention be necessarily limited to conventional materials. While the cold patch composition of this invention has been described in terms of conventional graded stones and gravels, other less-typical aggregates are also contemplated, including without limitation recycled plastics, crushed glass and recycled concrete. Sufficient aggregate may also be obtained directly from various sources of recycled asphalt roofing waste, primarily commercial roofs. As may be surmised from these examples, should the aggregate of this invention be so obtained, the resulting cold patch composition, with the exception of solvent, would derive entirely from recycled materials. An appropriate solvent distilled or otherwise isolated from a volatile component of the asphalt waste used could also be incorporated into the cold patch composition of this invention.

The recycled asphalt roofing wastes utilized by the composition and method of this invention are processed by methods well-known to those skilled in the art. Asphalt content varies from one roofing product to another, depending on the type and manufacturer. However, homogeneity and specificity are achieved with respect to asphalt, filler, and fiber content, such that the resultant cold patch provides measureable and reproducible engineering performance properties.

Typically, roofing waste from a variety of sources is processed to provide a homogeneous blend of the following components (weight percent): Asphalt (25-50), aggregate (5-25), granules (2-25), course filler (2-25), fine filler (5-40), and fiber (1-10). It should be realized that the overall proportion and composition of the recycled asphalt roofing waste utilized approximates the weighted average of all types of waste marketed in and indigenous to a specific locale.

The recycled asphalt roofing waste is size-graded to meet the physical requirements of a specific cold patch composition. Preferably, it is dimensioned less than about 9.5 mm. In highly-preferred embodiments, the asphalt roofing waste is dimensioned between about 0.85–4.75 mm. Gradations within the highly-preferred range tend to provide excellent homogeneity and workability. Finer gradations tend to present formulation difficulties. Larger cuts are somewhat detrimental to engineering performance properties. "Balling" or lumping of the cold patch material often occurs.

PREPARATION OF THE COMPOSITIONS

A number of factors must be considered when preparing cold patch compositions in accordance with the method of this invention. Among these are the relative amount and gradations of recycled asphalt roofing wastes and aggregate, the type of aggregate, the ratio of anti-strip agent to solvent, the ratio of solvent to the combined quantities of aggregate and roofing waste, the nature of the process equipment available, the order of addition, mixing times required, and the overall cold patch characteristics desired.

In the preparation of the composition of this invention, certain blending procedures are preferred. Roller mill-type mixing equipment, with baffles, horizontal paddle-type mixers, and a planetary-type blending mechanism provides excellent results. However achieved, thorough and complete blending of all ingredients is essential to ensure homogeneity and eventual success of the cold patch composition.

Conventional cold patches are prepared by first adding asphalt to solvent to form an appropriate asphalt solution. Aggregate is then coated with the solution with mixing. If filler and fiber are utilized they must be added in a separate third step.

The method of this invention involves adding a selected gradation and quantity of aggregate together with a selected quantity of solvent to a horizontal paddle mixer and blending to completely wet all aggregate. Assuming several gradations of recycled asphalt roofing waste are utilized, the finest grade is then added in the desired quantity with thorough mixing. In accordance with the preferred method of this invention, each successively courser grade is added in turn followed by additional mixing.

A single asphalt gradation may be used with excellent results, but if several gradations are utilized, the order of addition is critical. The progressive addition described above is advantageous in terms of the homogeneity and workability obtained. Alternate addition schemes are possible, but the order of the preferred method ensures the aggregate is uniformly-coated with asphalt. Furthermore, fiber and filler are dispersed evenly throughout the cold patch in one step, as the asphalt solution is formed in situ.

Determining optimal mix design is critical. The optimum design is generally considered to encompass the largest possible use of recycled asphalt roofing waste, with the least amount of aggregate and solvent, which still provides the required workability and field performance for a given application. Because asphalt is thermoplastic, a given mix design may be workable at one temperature but not another. Samples are thus conditioned at cold (30°–40° F.), ambient (70°–80° F.), and warm (120°–140° F.) temperatures to stimulate the variety of conditions under which a cold patch material may be handled and applied. Workability is evaluated using standard blending and mixing techniques.

Field performance, as a test of mix design, is more difficult to evaluate. Standardized methods are employed to determine engineering performance properties as required by the various highway authorities. Marshall flow and stability measurements are obtained, if a particular agency has adopted the Marshall method. Stripping tendencies, densities, and temperature-susceptibilities are also evaluated at varying compaction and test temperatures.

The most straight-forward way to determine an optimal mix design is to limit aggregate gradations to a range of 4.75–9.5 mm, restrict the asphalt waste gradations to a range of 0.85–6.3 mm, and maintain solvent levels below 5% by weight of the total composition with a ratio of anti-strip agent to solvent approximating 9:1. Within these parameters, varying the weight percentages of both the aggregate and recycled asphalt roofing wastes fractions between 40-60%, and observing the resultant workability and field performance, was found to provide the optimum mix design for a particular application.

End-use determines, in large part, an appropriate mix design. Varying the quantity and quality of each component, as detailed in the foregoing discussion, must be considered and can be used to provide a cold patch composition having the workability and field performance desired. Cold patch compositions are thus designed for particular geographic areas and to accommodate seasonal weather variations.

EXAMPLES OF THE INVENTION

In each of the examples that follow a cold patch composition was made by selecting the desired gradation of the paving aggregate, adding a petroleum distillate (9:1 solvent/anti-strip agent), mixing in a roller mill, followed by sequential addition and mixing of graded recycled asphalt roofing waste. The total time needed to prepare each composition, including ingredient addition, was approximately 20 minutes, irrespective of batch size. The compositions obtained were stored in sealed containers until the evaluations were performed.

DEFINITIONS

RARW: Recycled asphalt roofing waste; materials processed to a selected size, with foreign contaminants (nails, metal, and like debris) removed, in terms of parts by weight of a composition and by gradation.

Solvent Mix: A solution of the indicated anti-strip agent in the indicated solvent, in terms of percent by weight of the solution, and parts by weight of the composition.

Aggregate: Sized according to specific AASHTO- and ASTM-accepted procedures.

Gradations: Determined by a standard roto-tap method using recommended AASHTO and ASTM test procedures.

Workability: A blend/stir-back test, whereby the mix under evaluation was hand-stirred with observations made with respect to compacting, ease of mixing, degree of agglomeration or sticking, and homogeneity of aggregate coating.

Marshall Stability: As defined in the foregoing discussion.

Marshall Flow: As defined in the foregoing discussion.

Temperature-Susceptibility: Marshall stabilities determined at various compaction and test temperatures.

EXAMPLE 1

| | |
|---|---|
| RARW (6.3–9.5 mm) | 10 parts |
| RARW (4.75–6.3 mm) | 50 parts |
| RARW (0.85–4.75 mm) | 10 parts |
| Aggregate: Washed River Gravel (<9.5 mm) | 20 parts |
| Solvent Mix (90% Fuel Oil, 10% amine anti-strip) | 10 parts |

This compostion represents a cold patch exhibiting excellent initial and long-term workability over a wide range (30°–140° F.) of temperatures

EXAMPLE 2

| | |
|---|---|
| RARW (6.3–9.5 mm) | 40 parts |
| RARW (4.75–6.3 mm) | 7.5 parts |
| RARW (0.85–4.75 mm) | 5 parts |
| Aggregate: Washed River Gravel (<9.5 mm) | 45 parts |
| Solvent Mix (90% Fuel Oil, 10% amine anti-strip) | 2.5 parts |

This cold patch composition utilizes a higher percentage of course RARW than that used in Example 1. It exhibits excellent workability at 30°–140° F., as well as initial and conditioned Marshall stabilities and flows, using a lower level of solvent mix adjusted to the amount of RARW.

EXAMPLE 3

| | |
|---|---|
| RARW (6.3–9.5 mm) | 10 parts |
| RARW (4.75–6.3 mm) | 50 parts |
| RARW (0.85–4.75 mm) | 10 parts |
| Aggregate: Washed River Gravel (<9.5 mm) | 20 parts |
| Solvent Mix (90% Fuel Oil, 10% amine anti-strip) | 10 parts |

This compostion represents a cold patch compostion exhibiting excellent initial and aged workability with a percentage of fine RARW higher than that in either Examples 1 and 2.

EXAMPLE 4

| | |
|---|---|
| RARW (6.3–9.5 mm) | 10 parts |
| RARW (4.75–6.3 mm) | 50 parts |
| RARW (0.85–4.75 mm) | 10 parts |
| Aggregate: Washed River Gravel (<9.5 mm) | 20 parts |
| Solvent Mix (90% Fuel Oil, 10% amine anti-strip) | 10 parts |

The cold patch compostion exhibits excellent workability and water sensitivity with acceptable Marshall values, at a high percentage of RARW.

EXAMPLE 5

| | |
|---|---|
| RARW (4.75–6.3 mm) | 25 parts |
| RARW (0.85–4.75 mm) | 25 parts |
| Aggregate: Washed River Gravel (<9.5 mm) | 47.5 parts |
| Solvent Mix (90% Mineral Spirits 10% amine anti-strip) | 2.5 parts |

This compostion utilizes a mineral spirits (lower-boiling, quicker evaporating petroleum distill at fractions), and exhibits excellent workability an stability.

EXAMPLE 6

| | |
|---|---|
| RARW (6.3–9.5 mm) | 40 parts |
| RARW (0.85–4.75 mm) | 10 parts |
| Aggregate: Crushed Stone, (#8) | 47.5 parts |
| Solvent Mix (90% Fuel Oil, 10% amine anti-strip) | 5.0 parts |

This composition exhibits the use ("as is", without further screening) of a #8 graded crushed stone aggregate in place of rounded river gravel, to yield good workability and stability.

EXAMPLE 7

| | |
|---|---|
| RARW: (0.16–0.85 mm) | 45.2 parts |
| Aggregate: Crushed Stone (#8, "as is") | 50.0 parts |
| Solvent Mix (90% Kerosene, 10% amine anti-strip) | 4.8 parts |

This compostion exhibits the use of a very fine RARW and kerosene to provide a cold patch with excellent workability and stability.

EXAMPLE 8

| | |
|---|---|
| RARW: (6.3–9.5 mm) | 45.5 parts |
| Aggregate: Washed River Gravel (<9.5 mm) | 50.0 parts |
| Solvent Mix (90% Kerosene, 10% amine anti-strip) | 4.5 parts |

This cold patch compostion provides a mix with a Marshall stability of 300% greater than conventional cold patch materials, while maintaining superior workability.

EXAMPLE 9

| | |
|---|---|
| RARW: (0.85–4.75 mm) | 95 parts |
| Solvent Mix (80% Kerosene, 20% amine anti-strip) | 5 parts |

This compostion exhibits the use of a RARW containing sufficient aggregate to yield a stable, highly dense cold patch. A solvent mix with 20% amine anti-strip agent enhances and maintains workability.

EXAMPLE 10

| | |
|---|---|
| RARW: (0.85–4.75 mm) | 50 parts |
| Aggregate: Crushed Stone (#8 screened) | |
| (4.75–6.3 mm), and | 25 parts |
| (0.85–4.75 mm) | 22.5 parts |
| Solvent Mix: (90% Kerosene, 10% amine anti-strip) | 2.5 parts |

This composition exhibits optimal Marshall stabilities through the selection of a crushed and fractured aggregate over rounded stone, and demonstrates that selected size gradation of the crushed aggregate improves Marshall stabilities and flows. This cold patch has a Marshall stability 150% higher than those which use unscreened crushed stone.

EXAMPLE 11

Five cold patch compositions, one of which (B) is available through retail purchase, two of which (A and C) are available retail and used in the public sector, and one used only in the public sector (D), were tested against the composition of Example 10 of this invention. Core samples were compacted and otherwise prepared as disclosed herein. Each composition was evaluated without pre-conditioning (at "green strength"- no curing) at 77 F and compared on the basis of the Marshall stability measurements obtained.
Example 10 of this invention was shown to be 166% more stable (stronger) than conventional composition C and 180% more stable (stronger) than conventional composition B. Stability values could not be obtained for compositions A or D. (Marshall stability is measured in units of pounds-force, LBF.)

| Cold Patch | Marshall Stability |
|---|---|
| A | Non-compactible; the core specimen fell apart before testing. |
| B | Approximately 294 LBF |
| C | Approximately 310 LBF |

-continued

Five cold patch compositions, one of which (B) is available through retail purchase, two of which (A and C) are available retail and used in the public sector, and one used only in the public sector (D), were tested against the composition of Example 10 of this invention. Core samples were compacted and otherwise prepared as disclosed herein. Each composition was evaluated without pre-conditioning (at "green strength"- no curing) at 77 F and compared on the basis of the Marshall stability measurements obtained.
Example 10 of this invention was shown to be 166% more stable (stronger) than conventional composition C and 180% more stable (stronger) than conventional composition B. Stability values could not be obtained for compositions A or D. (Marshall stability is measured in units of pounds-force, LBF.)

| Cold Patch | Marshall Stability |
|---|---|
| D | Non-compactible; the core specimen fell apart before testing. |
| Example 10, above | Approximately 825 LBF |

While the principles of this invention have been described in connection with specific embodiments, it should be understood clearly that these descriptions are made only by way of example and are not intended to limit the scope of the invention. For example, the cold patch compositions discussed herein are of the type considered to be densely-graded; that is, the aggregate used is relatively fine. However, compositions of this invention may be extended to include open-graded mixes through selection of courser aggregate.

I claim:

1. In a cold patch pavement repair composition including an asphaltic bitumen solution, the improvement comprising:
 about 10–95 parts by weight recycled asphalt roofing waste as a predominant source of asphalt, filler, and fiber;
 about 19–70 parts by weight aggregate; and
 about 1–20 parts by weight solvent.
2. The compostion of claim 1 wherein the roofing waste is recovered asphalt roofing products.
3. The compostion of claim 1 wherein the roofing waste is substantially the only source of asphalt, filler, and fiber.
4. The composition of claim 1 wherein the roofing waste is about 40–60 parts by weight of the compostion.
5. The composition of claim 4 wherein the roofing waste is substantially then only source of asphalt.
6. The composition of claim 4 made using said roofing waste size-graded to a dimension less than about 9.5 mm.
7. The composition of claim 6 made using said roofing waste is size-graded to a range of about 0.85–4.75 mm.
8. The composition of claim 1 wherein the solvent is about 2–10 parts by weight.
9. The composition of claim 8 wherein the solvent is selected from the group consisting of a petroleum distillate and mixtures thereof.
10. The composition of claim 9 wherein the distillate includes a surfactant dissolved therein.
11. The composition of claim 10 wherein the surfactant is an anti-strip agent.
12. The composition of claim 11 wherein the anti-strip agent is an amine.
13. The composition of claim 10 wherein the ratio of distillate to anti-strip agent is at least about 4:1.
14. The composition of claim 1 wherein the aggregate is about 40–60 parts by weight.
15. The composition of claim 14 wherein the aggregate is crushed stone.
16. The composition of claim 15 wherein the crushed stone is size-graded to a dimension less than about 19.0 mm.
17. The compostion of claim 16 wherein about one-half the crushed stone is size-graded to about 0.85 mm and about one-half is size-graded to about 4.75 mm.

* * * * *

UNITED STATES PATENT AND TRADEMARK OFFICE
CERTIFICATE OF CORRECTION

PATENT NO. : 5,236,497

DATED : August 17, 1993

INVENTOR(S) : Ken F. Grzybowski

It is certified that error appears in the above-identified patent and that said Letters Patent is hereby corrected as shown below:

In column 2, line 54, delete "0%" and insert therefor --50%--

In column 2, line 55, delete "0%" and insert therefor --50%--

In column 16, line 1, delete the section commencing with the words "Five cold patch..." and ending with the words "...of pounds-force, LBF.)" which appears immediately prior to the balance of the table of Example 11 in column 16.

Signed and Sealed this

Eighth Day of March, 1994

Attest:

BRUCE LEHMAN

Attesting Officer

Commissioner of Patents and Trademarks